2,951,862

CHLORODIFLUOROPROPYL SUBSTITUTED SILANES AND SILOXANES

Ogden R. Pierce, Midland, Mich., assignor to Dow Corning Corporation, Midland, Mich., a corporation of Michigan No Drawing. Filed June 26, 1958, Ser. No. 744,654

4 Claims. (Cl. 260—448.2)

This invention relates to fluorinated chlorosilanes and their hydrolysis products.

It is the object of this invention to produce novel organosilicon compounds containing both fluorine and chlorine in the substituent group. Another object is to provide novel organosilicon compounds which are useful as improved lubricants. Other objects and advantages wil be apparent from the following description.

This invention relates to silanes of the formula $$CF_2ClCH_2CH_2SiX_{3-n}^{R_n}$$

in which R is a monovalent hydrocarbon radical or a hydrogen atom, X is of the group halogen and alkoxy radicals and $n$ has a value from 0 to 2 inclusive.

The silanes of this invention where X is halogen are best prepared by one of two methods. In those cases where R is a saturated aliphatic hydrocarbon radical or an aromatic hydrocarbon radical, the compounds are best prepared by reacting 3-chloro-3,3-difluoropropene-1 with a silane of the formula $R_nSiHX_{3-n}$ where R and $n$ are as above defined, in the presence of an addition catalyst such as organic peroxides, chloroplatinic acid or platinum dispersed on charcoal at a temperature of from 50 to 300° C. at superatmospheric pressure.

Those silanes in which some R's are hydrogen can be prepared by reacting the difluoropropene with a silane containing more than one hydrogen, i.e. $H_2SiCl_2$ or $H_2Si(OEt)_2$. Alternatively they can be prepared by reducing a halosilane of the formula $$CF_2ClCH_2CH_2SiX_{3-n}^{R_n}$$

with lithium aluminum hydride. The latter method is best for producing silanes with more than one hydrogen per silicon.

Those silanes in which R is an unsaturated aliphatic hydrocarbon radical are best prepared by reacting halo silanes of the formula $CF_2ClCH_2CH_2SiX_3$ with a Grignard reagent of the formula RMgX where R is an unsaturated aliphatic hydrocarbon radical. These reactions can be carried out in the conventional manner for employing Grignard reagents.

The silanes of this invention in which X is an alkoxy radical are best prepared by reacting the corresponding halo silanes of the formula $$CF_2ClCH_2CH_2SiX_{3-n}^{R_n}$$

with a monohydric alcohol. These reactions are carried out in the conventional manner for reacting alcohols with halo silanes.

When the halo and alkoxy silanes of this invention are hydrolyzed in the conventional manner for hydrolyzing such silanes, one obtains the siloxanes of this invention. These siloxanes are of the formula $$CF_2ClCH_2CH_2SiO_{\frac{3-n}{2}}^{R_n}$$

in which R and $n$ are as above defined.

For the purpose of this invention, R can be any monovalent hydrocarbon radicals such as any alkyl radical, such as methyl, ethyl, isobutyl, octadecyl and myricyl; any alkenyl radical such as vinyl, allyl, hexenyl, or octadecenyl; any cycloaliphatic hydrocarbon radical such as cyclopentyl, cyclohexyl, or cyclohexenyl; any aromatic hydrocarbon radical such as phenyl, tolyl, xylyl, xenyl, naphthyl and anthracyl, and any aralkyl hydrocarbon radical such as benzyl and β-penhylethyl.

The silanes and siloxanes of this invention can contain from 0 to 2 R groups per silicon atom. Thus, the silanes can be of the formula $CClF_2CH_2CH_2SiX_3$ $$CF_2ClCH_2CH_2SiX_2^R$$

and $$CF_2ClCH_2CH_2SiX^{R_2}$$

together with the corresponding siloxanes of the unit formula $CF_2ClCH_2CH_2SiO_{3/2}$, $$CF_2ClCH_2CH_2SiO^R$$

and $$CF_2ClCH_2CH_2SiO_{.5}^{R_2}$$

It should be understood that the siloxanes of this invention can be either homopolymers or copolymers. The copolymers can be combinations of various types of siloxane units in which the number or type of R group varies from unit to unit. The copolymers can contain any number of these various units.

In addition, the fluorinated siloxanes of this invention can be copolymerized with hydrocarbon substituted siloxanes of the formula $$Z_mSiO_{\frac{4-m}{2}}$$

in which Z is any monovalent hydrocarbon radical (such as those listed for R) or hydrogen, and $m$ has a value from 0 to 3 inclusive. The copolymers of this invention can be prepared by cohydrolyzing the various halosilanes or alkoxysilanes in the conventional manner for preparing siloxane copolymers.

This invention includes within its scope copolymers of the fluorinated siloxanes of this invention with any proportion of hydrocarbon substituted siloxanes. For example, the proportions of the fluorinated siloxane can range from .001 to 99.999 mol percent of the total copolymer; the remaining units being those of the formula $$Z_mSiO_{\frac{4-m}{2}}$$

where Z and $m$ are as above defined.

The silanes employed in this invention are useful as water repelling agents and as intermediates in the preparation of the siloxanes. The siloxanes of this invention, both homopolymers and copolymers, are useful as dielectric fluids and lubricants.

The following examples are illustrative only and should not be construed as limiting the invention which is properly delineated in the appended claims. In the specification, the following abbreviations are employed: Me for methyl, Et for ethyl, and Ph for phenyl.

EXAMPLE 1

A mixture of 3,3,3-trifluoropropene-1 and 3-chloro-3,3-difluoropropene-1 was reacted with methyldichlorosilane in the presence of chloroplatinic acid in amount of 3.6 grams per hundred pounds of mixed propenes at a temperature of about 250° C. under superatmospheric pressure. The resulting product was fractionated and there was obtained the compound $$CF_2ClCH_2CH_2\overset{Me}{Si}Cl_2$$

boiling point 152° C. at 750 mm. and having a specific gravity of 1.307 at 25° C. and a refractive index at 25° C. of 1.4138.

The chlorosilane was dissolved in toluene and hydrolyzed with water. The hydrolysis solution was refluxed with 1 gram of KOH to complete the condensation. The solution was washed neutral and the toluene was removed to give a residual oil of the unit formula $$CF_2ClCH_2CH_2\overset{Me}{Si}O$$

This fluid was found to be an excellent lubricant for steel on steel surfaces.

EXAMPLE 2

When 1 mol of $CClF_2CH=CH_2$ is reacted with 1 mol of the following silanes in the presence of chloroplatinic acid under the conditions of Example 1, the following fluorosilanes are obtained. When these are hydrolyzed in toluene solution in accordance with the procedure of Example 1, the following siloxanes are obtained.

Table

| Silane | Fluorosilane | Siloxane |
| --- | --- | --- |
| $H_2SiCl_2$ | $CF_2ClCH_2CH_2\overset{H}{Si}Cl_2$ | $CF_2ClCH_2CH_2\overset{H}{Si}O$* |
| $HSiCl_3$ | $CF_2ClCH_2CH_2SiCl_3$ | $CF_2ClCH_2CH_2SiO_{1.5}$ |
| $PhSiHCl_2$ | $CF_2ClCH_2CH_2\overset{Ph}{Si}Cl_2$ | $CF_2ClCH_2CH_2\overset{Ph}{Si}O$ |
| $Me_2SiHCl$ | $CF_2ClCH_2CH_2\overset{Me_2}{Si}Cl$ | $CF_2ClCH_2CH_2\overset{Me_2}{Si}O_{0.5}$ |
| $C_6H_{11}SiHCl_2$ | $CF_2ClCH_2CH_2\overset{C_6H_{11}}{Si}Cl_2$ | $CF_2ClCH_2CH_2\overset{C_6H_{11}}{Si}O$ |
| $C_6H_5C_6H_4\overset{H}{Si}Cl_2$ | $CF_2ClCH_2CH_2(C_6H_5C_6H_4)SiCl_2$ | $CF_2ClCH_2CH_2(C_6H_5C_6H_4)SiO$ |
| $C_{18}H_{37}SiHCl_2$ | $CF_2ClCH_2CH_2\overset{C_{18}H_{37}}{Si}Cl_2$ | $CF_2ClCH_2CH_2\overset{C_{18}H_{37}}{Si}O$ |
| $HSiF_3$ | $CF_2ClCH_2CH_2SiF_3$ | $CF_2ClCH_2CH_2SiO_{1.5}$** |

*No reflux with KOH.
**Hydrolyzed with sodium bicarbonate solution in amount sufficient to neutralize the HF produced.

EXAMPLE 3

When 1 mol of tribromosilane is reacted with 1 mol of 3-chloro-3,3-difluoropropene-1 in the presence of a small amount of tertiary butylperbenzoate at a temperature of 90° C., the composition $CF_2ClCH_2CH_2SiBr_3$ is obtained.

EXAMPLE 4

When the silane $$CF_2ClCH_2CH_2\overset{Me}{Si}Cl_2$$

is reacted with the following alcohols at a temperature below 50° C. in the absence of iron, the following alkoxy silanes are obtained.

| Alcohol | Alkoxy Silane |
| --- | --- |
| Methyl | $CF_2ClCH_2CH_2\overset{Me}{Si}(OMe)_2$ |
| Isopropyl | $CF_2ClCH_2CH_2\overset{Me}{Si}(OCHMe_2)_2$ |
| Octadecyl | $CF_2ClCH_2CH_2\overset{Me}{Si}(OC_{18}H_{37})_2$ |

EXAMPLE 5

When 1 mol of the silane $CF_2ClCH_2CH_2SiCl_3$ is reacted with 1 mol of vinyl magnesium bromide in tetrahydrofurane, the silane $$CF_2ClCH_2CH_2\overset{CH=CH_2}{Si}Cl_2$$

is obtained. When this silane is hydrolyzed in toluene solution a fluid siloxane having the unit formula $$CF_2ClCH_2CH_2\overset{CH=CH_2}{Si}O$$

is obtained.

That which is claimed is:
1. A silane of the formula $$CF_2ClCH_2CH_2\overset{R_n}{Si}X_{3-n}$$

in which R is selected from the group consisting of monovalent hydrocarbon radicals and hydrogen atoms, n has a value from 0 to 2 inclusive and X is selected from the group consisting of halogen and alkoxy radicals.

2. A composition in accordance with claim 1 where R is methyl and X is chlorine.

3. A siloxane of the unit formula $$CF_2ClCH_2CH_2\overset{R_n}{Si}O_{\frac{3-n}{2}}$$

in which R is selected from the group consisting of monovalent hydrocarbon radicals and hydrogen atoms, and n has a value of 0 to 2 inclusive.

4. A composition in accordance with claim 3 in which R is methyl.

References Cited in the file of this patent

UNITED STATES PATENTS 2,715,113  Gordon _____ Aug. 9, 1955

OTHER REFERENCES

Tarrant: WADC Technical Report 55–220 (August 1955), pp. 12, 19, 21 and 37.

McBee et al.: "Jour. Am. Chem. Soc.," vol. 79 (May 1957), pp. 2329–32.

Dyckes: ibid., part III (September 1957), pp. 2, 18, 20, 22, 29–32 and 35–38.